United States Patent
Tsukamoto et al.

[11] 3,835,463
[45] Sept. 10, 1974

[54] LIQUID CRYSTAL X-Y MATRIX DISPLAY DEVICE

[75] Inventors: Masahide Tsukamoto; Tetsuro Ohtsuka, both of Takatsuki, Japan

[73] Assignee: Matsushita Electric Industrial Co., Ltd., Kadoma, Osaka, Japan

[22] Filed: July 27, 1972

[21] Appl. No.: 275,742

[30] Foreign Application Priority Data
July 29, 1971 Japan.............................. 46-57384

[52] U.S. Cl...................... 340/324 M, 350/160 LC
[51] Int. Cl............................................... G02f 1/18
[58] Field of Search ........ 350/160 LC; 340/166 EL, 340/324 M

[56] References Cited
UNITED STATES PATENTS

| | | | |
|---|---|---|---|
| 3,322,485 | 5/1967 | Williams.......................... | 340/324 M |
| 3,441,513 | 4/1969 | Woodmansee ................ | 350/160 LC |
| 3,499,112 | 3/1970 | Heilmeier et al............... | 340/324 M |
| 3,653,745 | 4/1972 | Mao.............................. | 350/160 LC |
| 3,655,269 | 4/1972 | Heilmeier....................... | 340/324 M |

*Primary Examiner*—John W. Caldwell
*Assistant Examiner*—Marshall M. Curtis
*Attorney, Agent, or Firm*—Wenderoth, Lind & Ponack

[57] ABSTRACT

A matrix display device having a liquid crystal display element at each of the intersections of horizontal parallel strip shaped X-electrodes and vertical parallel strip shaped Y-electrodes. Each display element is excited by an X-address pulse applied to an X-electrode and a Y-signal applied to a Y-electrode for producing an image. The liquid crystal has a threshold voltage in a.c. operation above which the liquid crystal exhibits a change in transparency.

The X-address pulse is a gated a.c. voltage of frequency $f$, phase $\phi_1$, time interval $T_1$, amplitude $2V$ and average level $V_{av}$. The Y-signal is an a.c. voltage of frequency $f$, amplitude $V$, average level $V_{av}$ and phase $\phi_1$ which is switched to a different phase $\phi_2$ during a time interval $T_2$. The amplitude $V$ is equal to or less than the threshold voltage and more than one-third of the threshold voltage. The time interval $T_2$ is controlled by an image signal synchronized with the X-address pulse so that each display element has the transparency changed for producing an image.

6 Claims, 14 Drawing Figures

X-ADDRESS PULSE APPLIED TO $X_4$-ELECTRODE

FIG. 5a

$Y_5$-SIGNAL APPLIED TO $Y_5$-ELECTRODE

FIG. 5b

VOLTAGE APPLIED TO $C_{45}$

FIG. 5c

VOLTAGE APPLIED TO $C_{44}$

FIG. 5d

VOLTAGE APPLIED TO $C_{55}$

FIG. 5e

APPLIED
A.C. VOLTAGE

FIG.6a

TRANSPARENCY
OF LIQUID CRYSTAL

FIG.6b

APPLIED
A.C. VOLTAGE

FIG.6c

TRANSPARENCY
OF LIQUID CRYSTAL

FIG.6d

LIQUID CRYSTAL X–Y MATRIX DISPLAY DEVICE

BACKGROUND OF THE INVENTION

This invention relates to a liquid crystal X–Y matrix display device. There are two types of electro-optical display devices with liquid crystals. One type is a common device wherein each display element is independent and one control circuit is required for each display element. The other type is an X–Y matrix display device wherein display elements are formed at intersections of horizontal strip electrodes on one plate and opposing vertical strip electrodes on the other plate. The latter device has great advantage over the former when the number of the display elements becomes large, for example a large number of characters or images each made up of a plurality of display elements, since the number of the required electric parts can be reduced in the X–Y matrix display devices. For example, $m \times n$ display elements in an X–Y matrix display device are operated by only $m + n$ drivers connected to the strip electrodes, although $m \times n$ drivers can be required for $m \times n$ display elements to be operated in the above-mentioned common device having independent display elements.

In liquid crystal X–Y matrix display devices, a.c. operation is more desirable than d.c. operation of the liquid crystals thereof. The reasons are as follows:

1. a.c. operation prolongs the life time as compared with d.c. operation.
2. A group of nematic liquid crystals which exhibit so-called dynamic scattering has a threshold voltage in a.c. operation above which visible change is observed. This threshold voltage is important to prevent the cross effect which appears in the form of a cross on the display panel when a set of one X-electrode and one Y-electrode is energized.
3. A group of liquid crystal mixtures which exhibits cholesteric-to-nematic phase transition on application of an exciting electric field beyond a threshold electric field has a longer decay time when a.c. bias exists after the exciting electric field has been removed. A flicker-free-display can therefore be obtained.

The object of the invention is to provide a.c. driven electro-optical X–Y matrix display devices with liquid crystals.

SUMMARY OF THE INVENTION

Liquid crystal display elements arranged in matrix produce images when each display element is addressed sequentially and has the transparency changed. The a.c. voltage applied to a display element at the intersection of an X-electrode and a Y-electrode is produced by an X-address pulse applied to the X-electrode and a Y-signal applied to the Y-electrode. The liquid crystal between the X- and Y-electrodes has a threshold voltage above which the liquid crystal exhibits a change in transparency. The X-address pulse is a gated a.c. voltage, i.e., a pulse of an a.c. voltage of frequency $f$, phase $\phi_1$, amplitude $V_x$, average level $V_{avx}$ and time interval $T_1$. The Y-signal is an a.c. voltage of frequency $f$, amplitude $V_y$ average level $V_{avy}$ and phase $\phi_1$ which is switched to a phase $\phi_2$ during a time interval $T_2$. The amplitude $V_y$ is equal to or less than the threshold voltage and more than one-third of the threshold voltage and is substantially equal to a half of the amplitude $V_x$ of the X-address pulse. The average level $V_{avy}$ of the Y-signal is substantially equal to the average level $V_{avx}$ of the X-address pulse. The time interval $T_2$ is less than $T_1$ and is varied by a change in image signal synchronized with the X-address pulse. When the time interval is 0, the display element does not exhibit any change in transparency, because the maximum voltage applied to the display element does not exceed the threshold voltage. On the other hand, when the time interval $T_2$ is equal to $T_1$, the display element exhibits a change in transparency because the maximum voltage applied to the display element exceeds the threshold voltage. Half tones are obtained when the time interval $T_2$ is between 0 and $T_1$ excluding 0 and $T_1$.

DETAILED DESCRIPTION OF THE INVENTION

Figure 1:
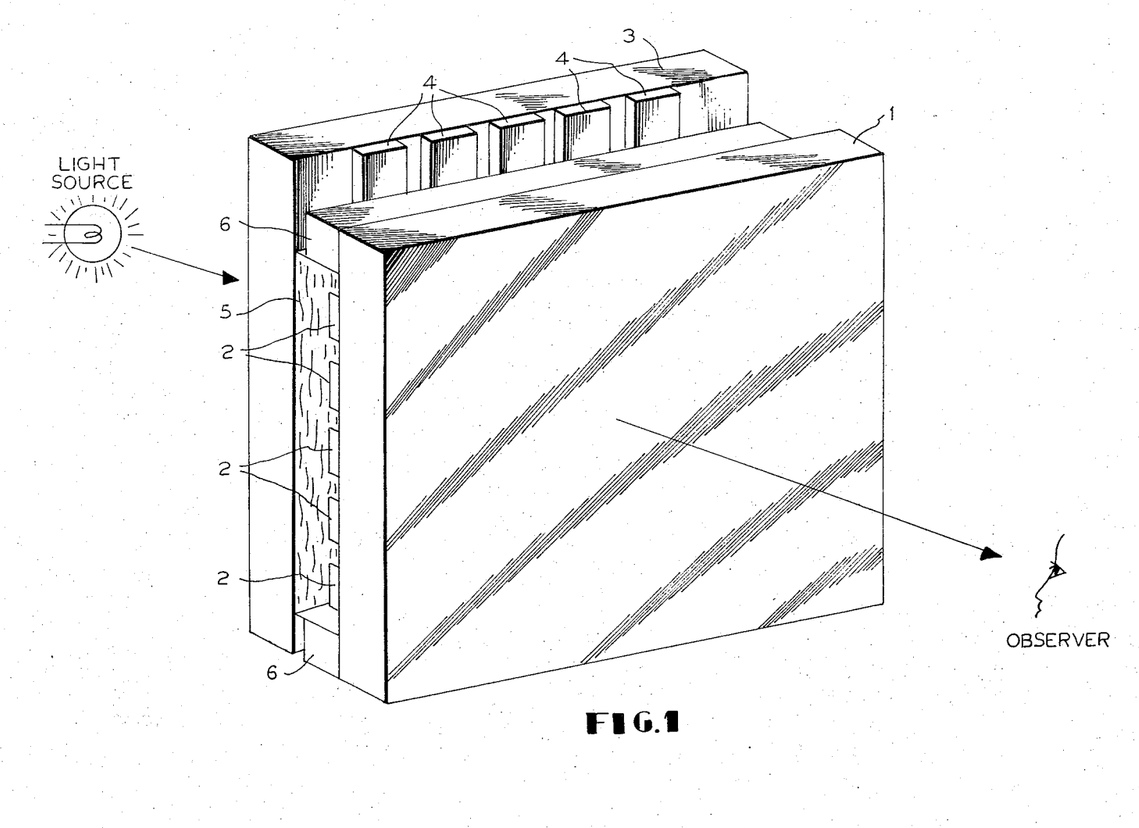
FIG. 1 is a perspective view of the liquid crystal X–Y matrix display panel according to the present invention.

FIG. 1 shows a typical liquid crystal X–Y matrix display panel of the light-transmissive type. Referring to FIG. 1, a plurality of horizontal strip shaped X-electrodes 2 which are transparent are applied to the surface of a first plate 1 which is transparent. The combination of the first X-electrodes 2 and the first plate 1 forms an X-electrode member which is light-transparent. Likewise, a plurality of vertical strip shaped Y-electrodes 4 which are transparent are applied to the surface of a second plate 3, and the combination of the Y-electrodes 4 and the second plate 3 form a Y-electrode member which is light-transparent. The X-electrodes 2 and the Y-electrodes 4 are opposed to each other and spaced at a distance determined by spacers 6 with the X-electrodes perpendicular to the Y-electrodes. The space between the X-electrode member and the Y-electrode member is filled with a liquid crystal 5. The portions of the liquid crystal at the intersections of the X-electrodes 2 and the Y-electrodes form a plurality of display elements.

In this liquid crystal X–Y matrix display panel, if a display element at an intersection of one X-electrode and one Y-electrode is excited by an electric field applied to both the X-electrode and the Y-electrode, an observer can see the display element modulating incident light from a light source placed behind the liquid crystal X–Y matrix display panel. The liquid crystal which can be used in the X–Y matrix display panel of the present invention as shown in FIG. 1 should have a threshold voltage in a.c. operation above which a visible change, i.e., a change of transparency, such as light scattering or transmission occurs.

Figure 2:
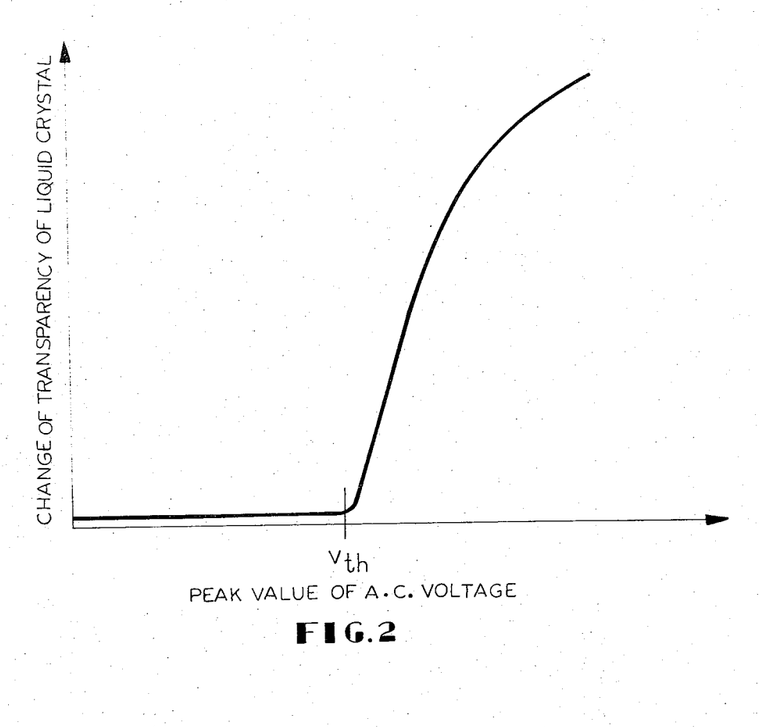
FIG. 2 is a graph showing the electro-optical properties of the liquid crystal used in the present invention.

The electro-optical properties of the liquid crystals used in the present invention are shown in FIG. 2 qualitatively. Referring to FIG. 2, the horizontal axis indicates the peak value of an a.c. voltage applied to a liquid crystal and the vertical axis indicates the change of transparency of the liquid crystal i.e., intensity of transmitted light or scattered light. A liquid crystal used in the present invention must have a threshold voltage Vth such that it does not exhibit any change in the transparency until the peak value of an a.c. voltage applied to the liquid crystal exceeds the threshold voltage Vth. When the peak value of the a.c. voltage exceeds the threshold voltage Vth, a visible change begins to occur. The threshold voltage changes with the change of the waveform of the a.c. voltage, frequency, and the distance between the X-electrodes 2 and the Y-electrodes 4. In the description hereinafter, "the threshold voltage" is the peak value of the a.c. voltage at which a liquid crystal in the liquid crystal X–Y matrix display panel begins to exhibit a visible change. Specific embodiments of liquid crystals which have the electro-optical properties as shown in FIG. 2 and which can be in the present invention will be described later.

Figure 3:
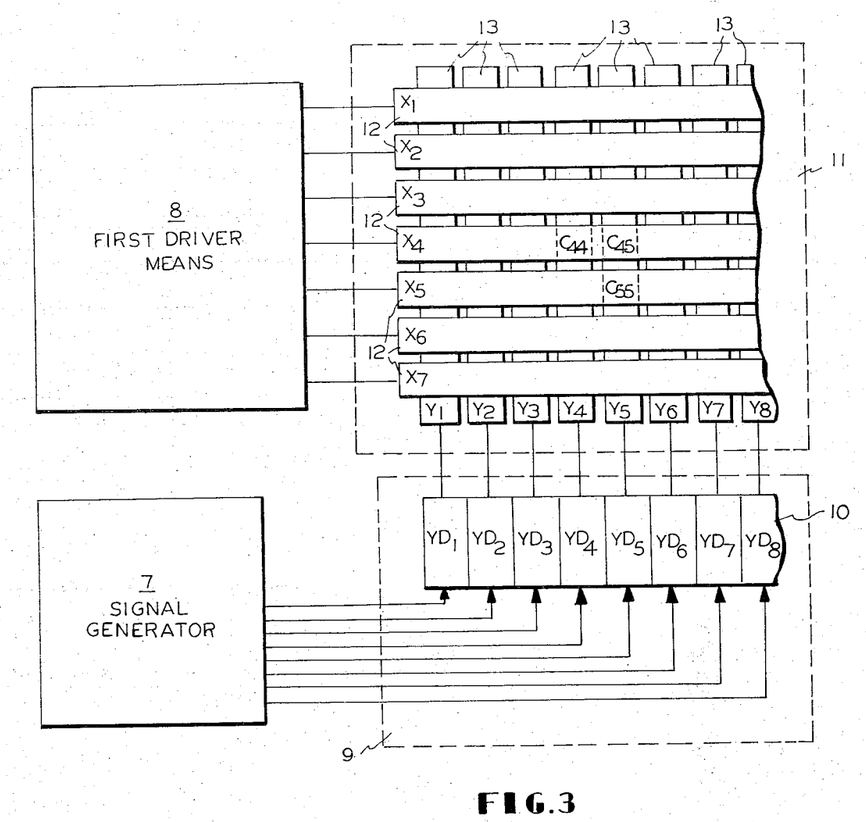
FIG. 3 is a schematic diagram, in block form, of one embodiment of the liquid crystal X–Y matrix display device of the present invention.

FIG. 3 is a schematic diagram, in block form, of one embodiment of the liquid crystal X–Y matrix display device of the present invention. Referring to FIG. 3, the liquid crystal X-Y matrix display panel 11 is driven by a first means 8 coupled to a signal generator 7 and a second means 9 coupled to the signal generator 7. The second means 9 consists of a plurality of Y-drivers 10, namely drivers $YD_1$, $YD_2$ ... $YD_8$. In FIG. 3, only strip-shaped X-electrodes 12 and strip-shaped Y-electrodes 13 of the liquid crystal X–Y matrix display panel, partially cut away, are shown.

As a matter of course, the liquid crystal having the electro-optical properties as shown in FIG. 2 is sandwiched between the X-electrodes 12 and the Y-electrodes 13. In FIG. 3, the X-electrodes consist of 7 X-electrodes $X_1$, $X_2$, .... $X_7$ and the Y-electrodes consists of 8 Y electrodes $Y_1$, $Y_2$ ... $Y_8$. However, in practice, more than 7 X-electrodes and more than 8Y electrodes can be used. A display element $C_{44}$ is formed at the intersection of electrode $X_4$ and electrode $Y_4$, a display element $C_{45}$ is formed at the intersection of electrode $X_4$ and electrode $Y_5$, and so on. The signal generator 7 generates X-address signals for addressing only one X-electrode at a time and also generates image signals which are synchronized with the X-address signals and applied to Y-drivers 10 for producing a desired image. The X-address signal is usually a coded signal. However, the X-address signal is not limited to a coded signal. The image signal is usually an amplitude-modulated signal. However, the image signal is not limited to an amplitude-modulated signal. The first means 8 is coupled to the signal generator 7 and to each of the X-electrodes. The first means 8 supplies an X-address pulse to an X-electrode addressed by an X-address signal generated by the signal generator 7. The X-address pulse has a gated a.c. voltage as shown in FIG. 4 and addresses only one X-electrode at a time under the control of the X-address signal. Each Y-driver supplies a Y-signal controlled by the image signal to a Y-electrode.

Figure 4A:
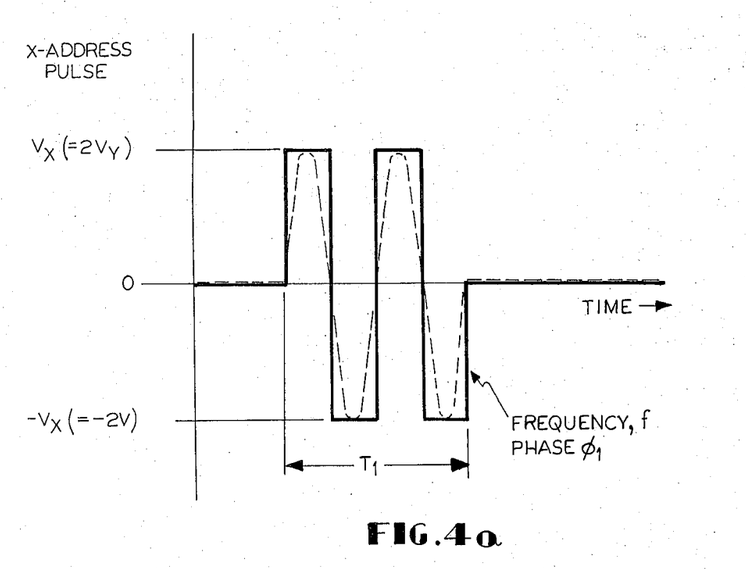
FIGS. 4a and 4b are graphs showing the waveform of the X-address pulse applied to the X-electrode and the Y-signal applied to each Y-electrode of the liquid crystal X–Y matrix display panel of the present invention.
Figure 4B:
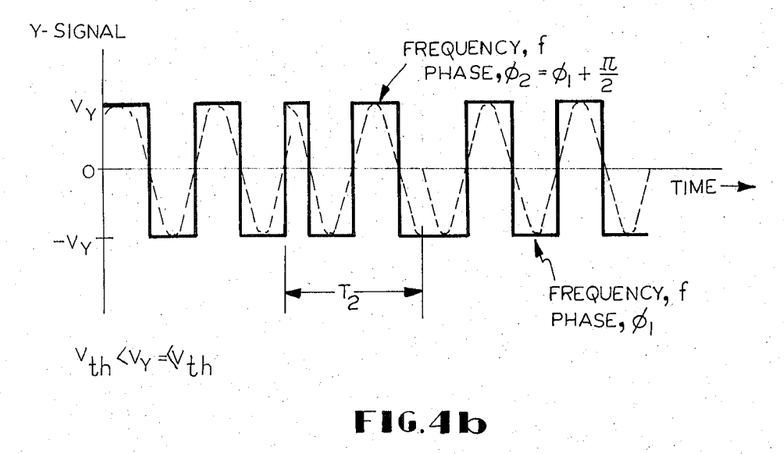

FIGS. 4a and 4b show the waveforms of the X-address pulse and the Y-signal. Referring to FIG. 4a, when one X-electrode is addressed by the X-address signal generated by the signal generator 7, the first means generates a gated a.c. voltage which is a pulse of an a.c. voltage having a rectangular waveform, frequency $f$, phase $\phi_1$, time interval $T_1$ amplitude $V_x$ and average level $V_{avx}$ as shown by the solid line. In FIG. 4a the average level $V_{avx}$ is the ground level. The amplitude $V_x$ is substantially equal to twice of amplitude the Y-signal described later. The phase of the rectangular waveform is such that the phase of the a.c. voltage having a rectangular waveform is the same as that of the a.c. voltage having a sinusoidal waveform as shown by the broken line, if both a.c. voltages are equal to the ground level at the same time as shown in FIG. 4a. The Y-signal generated by each Y-driver has a waveform as shown in FIG. 4b. The Y-signal is an a.c. voltage having a rectangular waveform, frequency $f$, amplitude $V_Y$, average level $V_{avy}$ and phase $\phi_1$ which is switched to a phase $\phi_2$ during a time interval $T_2$. In FIG. 4b, the average level $V_{avy}$ is the ground level. The amplitude $V_Y$ is equal to or less than the threshold voltage Vth and more than one-third of the threshold voltage Vth and is substantially equal to a half of the amplitude $V_x$ of X-address pulse. The frequency f and the phase $\phi_1$ are same as those of the X-address pulse. The time interval $T_2$ is varied in a range from 0 to $T_1$ with a change in image signal generated by the signal generator 7. More specifically, the time interval $T_2$ is varied in the range of 0 to $T_1$ with a change of amplitude, frequency, pulses width, number of pulses, etc. of the image signal.

For a simple illustration of the operation of the liquid crystal X–Y matrix display device as shown in FIG. 3, one example will be described hereinafter.

Figure 5A:
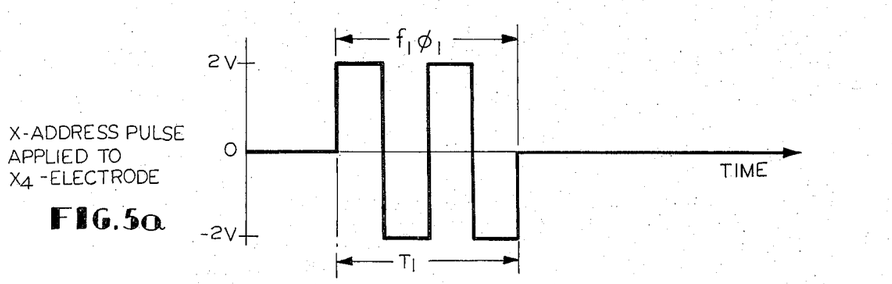
FIGS. 5a – 5e are graphs showing exemplary waveforms of the $X_4$-address pulse, applied to the $X_4$-electrode, the $Y_5$-signal applied to the $Y_5$-electrode and the resultant voltage applied to the display element $C_{45}$ at the intersection of the $X_4$-electrode and the $Y_5$-electrode.
Figure 5B:
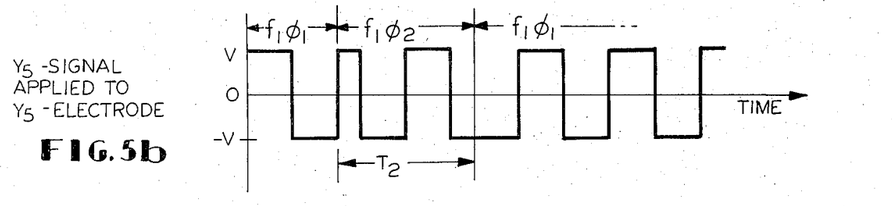
Figure 5C:
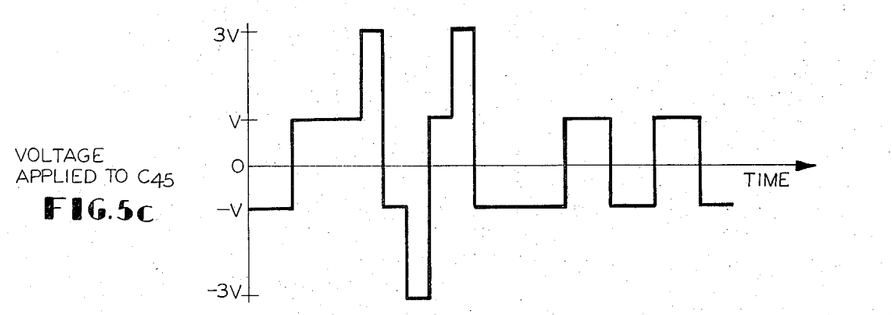
Figure 6A:
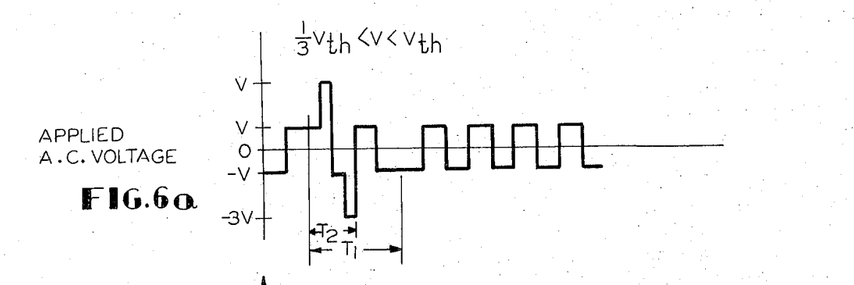
FIGS. 6a – 6d are graphs for illustrating how half tones are obtained.
Figure 6B:
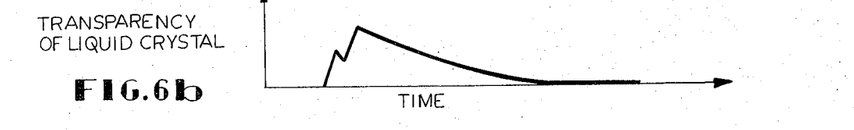
Figure 6C:
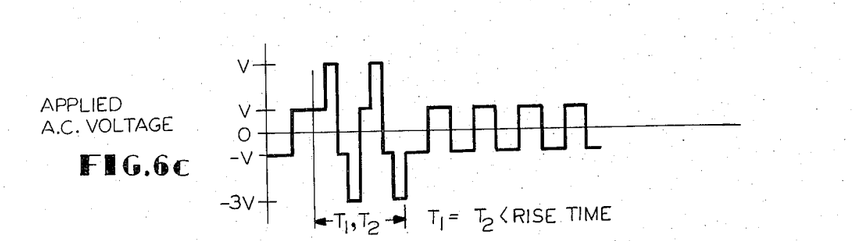
Figure 6D:
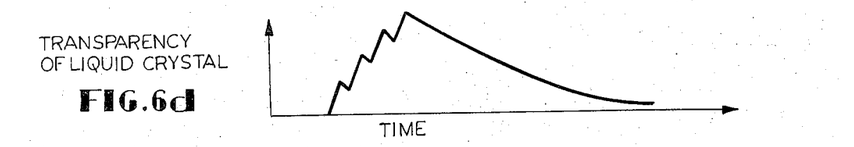

The transparency of one display element $C_{45}$ at the intersection of electrode $X_4$ and electrode $Y_5$ is changed in the following manner. The signal generator generates an X-address signal for addressing the electrode $X_4$ and also generates an image signal which is synchronized with the X-address signal and applied to a Y-driver $YD_5$ connected to electrode $Y_5$. The first means supplies an X-address pulse to the electrode $X_4$ addressed by the X-address signal. The X-address pulse is a gated a.c. voltage having rectangular waveform, frequency $f$, phase $\phi_1$, amplitude 2V, time interval $T_1$ and an average level of the ground level, while the level of the other X-electrodes $X_1$, $X_2$, $X_3$, $X_5$, $X_6$ and $X_7$ is kept at the ground level. The Y-driver $YD_5$ belonging to the second means supplies $Y_5$-signal to electrode $Y_5$. The $Y_5$-signal is an a.c. voltage having a rectangular waveform, frequency $f$, phase $\phi_1$, amplitude V and an average level of the earth level. The phase $\phi_1$ is switched to phase $\phi_2$ during a time interval $T_2$ when the Y-driver $YD_5$ receives the image signal synchronized with the X-address pulse. Meanwhile, continuous a.c. voltage of phase $\phi_1$ is applied to the other electrodes, $Y_1$, $Y_2$, $Y_3$, $Y_4$, $Y_6$, $Y_7$, .... The X-address pulse applied to the electrode $X_4$ and the $Y_5$-signal applied to electrode $Y_5$ are shown in FIGS. 5a and 5b. The amplitude V of the Y-signal is equal to or less than the threshold voltage Vth and more than one-third of the threshold voltage Vth as shown in FIG. 4b. The resultant voltage applied to the element $C_{45}$ is obtained by subtracting the $Y_5$-signal from the X-address pulse applied to $X_4$-electrode and is shown in FIG. 5c. The peak voltage 3V applied to the element $C_{45}$ exceeds the threshold voltage Vth because the voltage V is more than one-third of the threshold voltage. Since the number of the peaks of voltage applied to the display element $C_{45}$ varies with the change of the time interval $T_2$ which is controlled by the image signal, the transparency of the display element $C_{45}$ is varied, if the maximum time interval of $T_2$ (i.e., $T_1$) is arranged to be less than the rise time of the liquid crystal used in the liquid crystal X–Y matrix display panel, where the rise time is the time interval for the liquid crystal to reach a steady state from unexcited state when the liquid crystal is excited by sudden application of an a.c. voltage. The reason why the transparency of the display element is varied with the change of the number of the peaks of the applied voltage beyond the threshold Vth can be understood by referring to FIGS. 6a–6d. Referring to these figures the maximum time interval $T_2$ of the Y-signal is arranged to be less than the rise time of the liquid crystal. As shown in FIG. 6b and 6d since the decay time required for the liquid crystal to return from the excited state to the unexcited state is long, the transparency of the display element $C_{45}$ is varied with the change in the number of the peaks of applied voltage or the time interval $T_2$ controlled by the image signal.

Figure 5D:
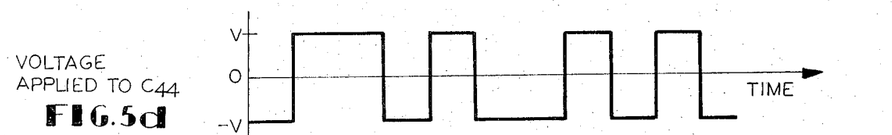
Figure 5E:
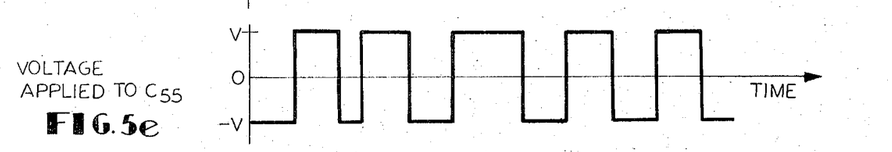

The display elements other than the display element $C_{45}$, for example display elements $C_{44}$ and $C_{55}$ shown in FIG. 3, are not affected by the application of the X-address pulse to electrode $X_4$ and the Y-signal to electrode $Y_5$, since the voltage applied to the display element $C_{44}$ and $C_{55}$ does not exceed the threshold voltage Vth. The voltages applied to the display elements $C_{44}$ and $C_{55}$ are shown in FIGS. 5d and 5e.

If the process such as that for the display element $C_{45}$ is sequentially performed for each of a plurality of predetermined display elements and is repeated so fast that flicker is not observed, a desired image can be obtained on the liquid crystal display panel. Each display element at each intersection of the X-electrodes 12 and the Y-electrodes 13 changes its transparency with the change of the time interval $T_2$ varied with a change in the image signal so that the desired image is formed on the liquid crystal X–Y matrix display panel.

Any arrangement may be used for the first means 8 so long as the arrangement supplies an X-address pulse such as shown in FIG. 4a to an X-electrode addressed by an X-address signal generated by the signal generator.

Any arrangement may be used for the second means 9 instead of a plurality of Y-drivers connected to each Y-electrode, so long as the arrangement supplies a Y-signal as such shown in FIG. 4b and FIG. 5b to a desired Y-electrode.

Any arrangement may be used for signal generator 7 so long as the arrangement generates an X-address signal and an image signal synchronized with X-address signal.

From the discussion with reference to FIGS. 5a–5c, it can be understood that, even if the phase difference $\phi_1-\phi_2$ is changed in a range from $-\pi$ to $\pi$ except 0, similar results are obtained. In the above illustration, a one-element-at-a-time addressing method is employed, where only one display element is addressed at a time. However, other addressing methods may be employed, such as a one-line-at-a-time addressing method where all display elements on one X-electrode are addressed at one time.

The waveform of the X-address pulse and the Y-signal is not limited to the rectangular waveform which is used in the above illustration. Other waveforms may be employed, for example, sinusoidal or triangular waveforms. In the case of sinusoidal or triangle waveforms, a peak value is obtain which is less than 3V, except when the phase difference $\phi_1-\phi_2=\pm\pi$. But if the amplitude and the phase difference are arranged in such a manner that the peak value exceeds the threshold voltage Vth, similar results to that in the case of a rectangular waveform can be obtained.

The amplitude $V_x$ of the X-address pulses is twice the amplitude $V_y$ of the Y-signal as shown in FIGS. 4a and 4b. However, it has been found from an experiment with a liquid crystal $L_4$ described later that, even if an amplitude three times as large as the amplitude $V_y$ of Y-signal is used, images can be obtained although the contrast is low. Therefore, the relation between the amplitudes $V_x$ and $V_y$ is not so strictly limited. Although the average level $V_{avx}$ of the X-address pulse and the average level $V_{avy}$ of the Y-signal are the same ground level in FIGS. 4a and 4b they are not limited to the ground level. It is possible to use an X-address pulse, the average level $V_{avx}$ of which is not ground level, i.e. an i.e., a gated a.c. voltage biased by a d.c. voltage $V_{avx}$ and a Y-signal, the average level $V_{avy}$ of which is not ground level, i.e., an a.c. voltage biased by a d.c. voltage $V_{avy}$, so long as the average levels $V_{avx}$ and $V_{avy}$ are substantially the same. It has been found by experiment that even if a small voltage difference between $V_{avx}$ and $V_{avy}$ exists, images can be obtained unless the absolute voltage difference $|V_{avx}-V_{avy}|$ exceeds 20 percent of the amplitude $V_y$ of Y-signal. In practice, it is more convenient for designing circuits to set the average level $V_{avx}$ or $V_{avy}$ at a level other than ground level.

For character display, the time interval $T_2$, during which the phase $\phi_1$ of a.c. voltage of the Y-signal is switched to phase $\phi_2$, is kept constant time interval because half tones are not required. Therefore, the circuit of each Y-driver generating the Y-signal can be kept simple for character display.

In the foregoing, liquid crystal X–Y matrix display panels of the light-transmissive type have been described. However, it is possible to make liquid crystal X–Y matrix display panels of the light-reflective type wherein only the X-electrode member or only the Y-electrode member is light-reflective. In FIG. 1 if, as a matter of course, in the case that the X-electrode member is light-reflective, the observer must see the panel from the side of the light source and if the Y-electrode member is light-reflective, the light source must be on the side of the observer. The liquid crystal display panel described hereinbefore is a matrix-type panel having parallel strip shaped X- and Y-electrodes. However it is appreciated that other shapes of electrodes can be used for forming different shaped display elements for displaying a variety of desired image patterns. For example, a well known 7-segment alpha-numeric display panel can be made without departing from the scope of the present invention.

Liquid crystals having the electro-optical properties as shown in FIG. 2 and which are useful in the liquid crystal X–Y matrix display device of the present invention are for example.

$L_1$: nematic liquid crystals having a negative dielectric anisotropy.

$L_2$: cholesteric liquid crystal mixtures $L_3$: liquid crystal mixtures of a nematic liquid crystal having a positive dielectric anisotropy and a cholesteric liquid crystal.

$L_4$: liquid crystal mixtures of a nematic liquid crystal having a negative dielectric anisotropy, a nematic liquid crystal having a positive dielectric anisotropy and a cholesteric liquid crystal.

A nematic liquid crystal classified in the $L_1$ class is an organic compound having its molecular dipole moment perpendicular to its long molecular axis. Typical compounds which represent the $L_1$ class are anisyladines, p,p'-dialkoxyazoxybenzenes, p-alkoxybenzylidene-p'-acylogyanilines and p-alkoxybenzylidene-p'-alkylanilines. These liquid crystals are known to exhibit so-called "dynamic scattering" when subjected to an electric field at low frequency or a d.c. electric field between two light-transparent electrodes. The nematic liquid crystal ($L_1$) sandwiched between two light-transparent electrodes is relatively light-transparent, but exhibits light-scattering caused by ion flow when d.c. or low frequency a.c. voltage beyond a threshold voltage Vth is applied thereto. A relationship between frequency and threshold voltage has been measured by the Orsay Liquid Crystal Group (Phy. Rev. Letters, 25, (1970)). According to the Orsay Liquid Crystal Group, the threshold voltage Vth at a frequency below a critical frequency fc is low and about 5 to 6 volts independently of the distance between the two electrodes. At a frequency above the critical frequency fc, the liquid crystal shows light-scattering caused not by ion flow but by dielectric deformation. In this case, the threshold voltage Vth becomes high, about 200 volts for a distance of 100μm between two electrodes. If a low threshold voltage at low frequency is used in the present invention, the frequency of the X-address pulse and the Y-signal should be below the critical frequency fc. If a high threshold voltage at high frequency is used in the present invention, the frequency of the X-address pulse and the Y-signal should be above the critical frequency fc.

It is known that when the frequency of the applied a.c. voltage is very low, the lives of liquid crystals become very short. In view of this, it is known that the lower limit of the frequency of the applied a.c. voltage to be used is usually about 10 Hz. It is known that there is no upper limit of the frequency of the applied a.c. voltage to be used, at least when the frequency is lower than the critical frequency fc. It is known that the critical frequency fc depends on the kinds of the liquid crystal compounds, impurities in the liquid crystals and temperature, and that usually fc of a nematic liquid crystal is a few hundred Hz to about a thousand Hz. However, as set forth above, when the frequency exceeds fc, the threshold voltage Vth becomes suddenly very high. Further, it is known that as the frequency of the applied a.c. voltage increases at a frequency range above fc, the threshold voltage Vth also increases. It is known that the threshold voltage Vth should not be higher than the breakdown voltage of the liquid crystal cell or the breakdown voltage of other elements used such as transistors. Therefore, it is a matter of course that when the device of the present invention is used at a frequency above fc, the upper limit of the frequency to be employed is such frequency that does not make Vth exceed either the breakdown voltages of the liquid crystal cell on the transistors used. Usually, the breakdown voltages of the transistors are about 300 volts.

Typical liquid crystals classified in the $L_2$ class are cholesteric liquid crystal mixtures consisting of cholesteryl chloride and the other cholesterin derivatives, for example, a cholesteric liquid crystal mixture consisting of cholesteryl chloride, cholesteryl nonanoate and cholesteryl oleyl carbonate. Those cholesteric liquid crystal mixtures have a threshold voltage above which the cholesteric phase is transformed to the nematic phase. This phase transition can be observed with the naked eye, but not distinctly. The phase transition can be observed distinctly, i.e. with high contrast, if crossed polarizers are used. This phase transition can be induced by both d.c. and a.c. voltage applied to the cholesteric liquid crystal. The nematic phase induced by a d.c. or a.c. voltage can be kept for a long time when a d.c. or a.c. voltage below the threshold voltage exists after the d.c. or a.c. voltage for excitation has been removed. This phenomena is suitable for producing a flicker-free image using the liquid crystal X-Y matrix display device of the present invention, because an a.c. voltage below the threshold voltage is always applied to the liquid crystal in the X-Y matrix display panel of the present invention.

Liquid crystal mixtures classified in the $L_3$ class are mixtures of a nematic liquid crystal having a positive dielectric anisotropy and a cholesteric liquid crystal. A nematic liquid crystal having a positive dielectric anisotropy is an organic compound having its molecular dipole moment parallel to its long molecular axis. Typical compounds which represent the nematic liquid crystals having a positive dielectric anisotropy are p-alkoxybenzylidene-p'-cyanoanilines, p-cyanobenzylidene-p'-alkoxyanilines, p-alkoxybenzylidene-p'-aminoazobenzenes and n-alkyl-p-cyanobenzylidene-p'-aminociunamates. Liquid crystal mixtures of $L_3$ class have a cholesteric phase, too. However, the appearance of the cholesteric phase of $L_3$ liquid crystals is different from that of mixture of cholesteric liquid crystals when a d.c. or a.c. voltage applied to the liquid crystal mixture between two light-transparent electrodes is increased. The liquid crystal mixture between two light-transparent electrodes is relatively light-transparent before a d.c. or a.c. voltage is applied thereto. It becomes opaque when a d.c. or a.c. voltage is applied thereto and the opaque state continues until the voltage reaches a threshold voltage. Above the threshold voltage, the opaque state is changed to a light-transparent state. The liquid crystal mixtures of the $L_3$ class have a similar advantage to that of the cholesteric liquid crystal mixtures of the $L_2$ class in that the decay time is prolonged when an a.c. voltage below the threshold voltage exists across the liquid crystal mixture. Since an a.c. voltage below the threshold voltage required for prolonging the decay time always exists in the driving arrangement used in the present invention, flicker-free images can be obtained by employing a liquid crystal mixture of the $L_3$ class in the present invention. A frequency above about 10Hz is effective for the prolongation of the decay time. Of course, not only a liquid crystal mixture consisting of one nematic liquid crystal having a positive dielectric anisotropy and one cholesteric liquid crystal, but also a liquid crystal mixture consisting of a plurality of nematic liquid crystals having a positive dielectric anisotropy and a plurality of cholesteric liquid crystals can be used in the liquid crystal X–Y matrix display devices of the present invention, because they have similar electro-optical properties.

Liquid crystal mixtures classified in the $L_4$ class have similar electro-optical properties to that of the liquid crystal mixtures of the $L_3$ class. However, the liquid crystals of the $L_4$ class have the advantages of stability with respect to solidification at room temperature operation and rapid response, i.e., short rise time. Better performance can be attained by using the liquid crystals of the $L_4$ class in the liquid crystal X–Y matrix display devices of the present invention. An examplary liquid crystal mixture from the $L_4$ class and which has better performance will be described hereinafter. The exemplary liquid crystal mixture of the $L_4$ class consists of two nematic liquid crystals having a positive dielectric anisotropy, namely 30 mole percent of $p$-$n$-butoxybenzylidene- $p'$-cyanoaniline and 18 mol percent of $p$-$n$-octoxybenzylidene-$p'$-cyanoaniline, one nematic liquid crystal having a negative dielectric anisotropy namely 47 mole percent of $p$-methoxybenzylidene-$p'$-$n$-butylaniline, and one cholesteric liquid crystal, namely 5 mole percent of cholesteryl oleyl carbonate. This liquid crystal mixture is in the liquid crystal phase at room temperature and is relatively light-transparent between two light-transparent electrodes spaced at a distance of $30\mu$ before an a.c. voltage is applied thereto. It becomes opaque when an a.c. voltage having a rectangular waveform is applied and the opaque state remains until the applied voltage reaches a threshold voltage 45 volts. Above the threshold voltage of 45 volts, the opaque state is rapidly transferred to a light-transparent state. When the applied a.c. voltage is decreased from a voltage above the threshold voltage, the liquid crystal mixture again becomes opaque below the threshold voltage 45 volts and the opaque state remains even if the applied a.c. voltage is removed. The opaque state remains for several weeks without any applied voltage. Similar electro-optical properties can be obtained by using a d.c. voltage or a.c. voltages of sinusoidal waveform or other waveforms.

The rise time of the liquid crystal mixture is about 30 m sec. when the amplitude of the suddenly applied a.c. voltage of rectangular waveform is 135 volts (45 volts × 3). The decay time is controlled by the amplitude of a bias voltage below the threshold voltage of 45 volts. The a.c. bias voltage always exists on the liquid crystal mixture in the liquid crystal X–Y matrix display devices of the present invention. More than ten minutes of decay time can be obtained with an a.c. bias voltage having an amplitude of 44 volts, rectangular waveform and a frequency of 100Hz, although the decay time is 20 m sec. without any bias voltage. A d.c. bias voltage can also prolong the decay time, but the prolonged decay time is about 10 sec. at most.

If the above mentioned exemplary liquid crystal mixture is used in the liquid crystal X–Y matrix display device of the present invention, an X–Y matrix display with at least more than 10 thousand display elements (100 X-electrodes and 100 Y-electrodes) is possible, although the addressing speed is slow.

It is known that the upper limit of the frequency of the applied voltage to be used for the liquid crystals classified as $L_2$, $L_3$ and $L_4$ as set forth hereinbefore is affected by the frequency dependence of the dielectric anisotropy of the liquid crystals. A liquid crystal cell containing one of the liquid crystals of the $L_2$, $L_3$ and $L_4$ classes operates so long as the dielectric anisotropy is positive. For example, the upper limit frequency for the liquid crystal decribed above as one example of the $L_4$ class is about 10 KHz at room temperature. The lower limit frequency is about 10 Hz for the same reason as set forth before in connection with the material of $L_1$ class.

As described hereinbefore, the present invention provides a novel liquid crystal X–Y matrix display device which has a long life because of a.c. voltage operation and is free from flicker, and which produces clear and high contrast images.

What we claim is:

1. In a liquid crystal X-Y matrix display device which has:

a liquid crystal X–Y matrix display panel including (1) an X-electrode member having a first plate and a plurality of strip-shaped X-electrodes applied to the surface of said first plate, (2) a Y-electrode member is spaced opposed relationship to said X-electrode member and having a second plate and a plurality of strip-shaped Y-electrodes applied to the surface of said second plate, at least one of said X- and Y-electrode members being light-transparent, and (3) a liquid crystal which fills the space between said X- and Y-electrode members and has a threshold voltage in a.c. operation above which said liquid crystal exhibits a change in the transparency, the direction of said X-electrodes being perpendicular to the direction of said Y-electrodes and said X- and Y-electrodes and said liquid crystal therebetween form a plurality of display elements at the intersections of said electrodes;

a signal generator for generating X-address signals and image signals synchronized with said X-address signals;

first means coupled to said signal generator and to each of said X-electrodes and supplying each of said X-electrodes addressed by each of said X-address signals generated by said signal generator with an X-address pulse; and second means being coupled to said signal generator and to said Y-electrodes for generating Y-signals and supplying each of said Y-electrodes with Y-signals which have an a.c. voltage amplitude $V_y$, an average level $V_{avy}$ and phase $\phi_2$, and supplying each of said Y-electrodes with each of said Y-signals, whereby said display elements change in transparency with the change in the time interval of the Y-signal controlled by said image signal so that a desired image is formed on said liquid crystal layer of the matrix panel;

the improvement comprising said first means comprising means for supplying said X-address pulse as a gated a.c. voltage having a time interval $T_1$, an operative frequency f above that which will unduly shorten the life of the liquid crystal and below that which will cause the turn-on threshold voltage of the liquid crystal to exceed the breakdown voltage of the device, phase $\phi_1$ the same as that of said Y-signal, amplitude $V_x$ and average level $V_{avx}$, and said second means comprises means for supplying said Y-signal with a frequency the same as the frequency of said X-address pulse and for switching the phase $\phi_1$ of said Y-signal to said phase $\phi_2$ during a time interval $T_2$ with a change in the corresponding image signal and for supplying said Y-signal with an amplitude $V_y$ no higher than said turn-on threshold voltage at said frequency f and more than one-third of said turn-on threshold voltage and substantially equal to a half of said amplitude $V_x$ of said X-address pulse, and with an average level $V_{avy}$ substantially equal to said average level $V_{avx}$ of said X-address pulse.

2. The improvement as claimed in 1, wherein both of said X- and Y-electrode members are light-transparent.

3. The improvement as claimed in 1, wherein said X-electrodes are light-reflective.

4. The improvement as claimed in claim 1 wherein phase difference $\phi_1-\phi_2$ between said phase $\phi_1$ and said phase $\phi_2$ is equal to $\pm\pi$.

5. The improvement as claimed in claim 1 wherein said first means and said second means generate an X-address pulse and a Y-signal having a rectangular waveform.

6. The improvement as claimed in claim 1 wherein said first means and said second means generate an X-address pulse and a Y-signal having a sinusoidal wave form.

* * * * *